United States Patent Office 3,258,454
Patented June 28, 1966

3,258,454
ADHESIVE ACRYLIC ACID ESTER/ACRYLIC ACID COPOLYMERS CROSSLINKED WITH POLYOLS
Joseph A. Vona, Westfield, and John W. Wyart, Maplewood, N.J., assignors to Celanese Corporation of America, New York, N.Y., a corporation of Delaware
No Drawing. Filed June 12, 1962, Ser. No. 201,783
6 Claims. (Cl. 260—86.1)

This invention relates to novel polymers. It more particularly refers to polymers which have good cohesive strength and are adapted to use as pressure sensitive adhesives.

According to one aspect of this invention, a copolymer of an acrylic acid and an acrylic acid ester is crosslinked with a polyfunctional alcohol, particularly a polyhydric alcohol having a quaternary carbon atom with alkylol groups pendant therefrom.

The copolymerization of acrylic acids and acrylates is quite well known in the art. Such copolymers are prepared in accordance with these well known teachings and as such are adapted to use herein. In one particular method of preparation for one particular copolymer, which preparation will serve to illustrate the general preparations known to the art but which illustration is in no way limiting upon the scope of this invention, a solvent mixture of 50% by weight Cellosolve acetate (ethoxy ethyl acetate) and 50% by weight cumene is prepared; 750 parts by weight thereof mixed with 6 parts by weight of benzoyl peroxide; and the mixture heated to reflux temperature under a nitrogen blanket. Butyl acrylate and acrylic acid are mixed together in 4 to 1 weight proportions; 6 parts by weight of benzoyl peroxide is dissolved in 1200 parts by weight of the monomer mixture; and the whole mass added over a 7 hour period to the refluxing solvent mixture. The reaction is continued for about 1.5 hours at 150° C. whereupon 6 parts by weight of benzoyl peroxide dissolved in 50 parts by weight of solvent mixture is added and the reaction continued for an additional 3 hours. The resulting polymer has a viscosity at 30° C. of 650 cps., a solids content of 61 weight percent and an acid number of 98.4 mg. KOH/gm. sample.

Acrylic acid-acrylate copolymers as exemplified above are crosslinked to a soft rubbery material exhibiting a high degree of tackiness by reaction with a polyol according to this invention. Illustrative polyols include neopentylglycol, pentaerythritol, trimethylol propane and trimethylolethane.

Crosslinking can be accomplished by adding an excess of polyol, based upon the acid number of the acrylic copolymer, to the polymer together with an acid esterification catalyst; heating to a temperature sufficient to support esterification; and removing the water of esterification. Esterification temperatures suitably range from about 150 to 220° C., preferably esterification is carried out under reflux conditions. The pressure is suitably atmospheric but higher or lower pressures may be used if desired. Reaction time is controlled by the other reaction variables including temperature and the proportion of polyol added. Preferably, the reaction is continued for just so long as water of esterification is evolved. The proportion of polyol utilized can vary from the mole equivalent of hydroxyl to acid to about 50 mole percent excess. If desired, less than the mole equivalent of hydroxyl to acid can be used but in such case the pendant carboxyl groups of the acrylic polymer backbone will be incompletely esterified. Strong acid esterification catalysts are particularly useful in this invention. This catalyst group is well known and includes sulphuric acid, cation exchange resins having sulfonic acid substituents thereon and para toluene sulfonic acid. The proportion of catalyst can range from about 50 to 500 parts per million based upon total weight of reactants.

Example I

In one specific illustration, an 80% butyl acrylate-20% acrylic acid copolymer was crosslinked with trimethylene propane. The copolymer, 340 parts by weight, 28.9 parts by weight of trimethylol propane and 0.0289 part by weight of para toluene sulfonic acid were mixed together and brought to reflux, about 160° C., for about 2.5 hours. About 40% of the theoretical water of esterification was collected resulting in a crosslinked polymer having a solids content of 63.1% by weight and a viscosity at 30° C. of 1250 cps. The polymer was formed into a film which was tacky after having been heated to 300° F. for one hour and which had much higher cohesive strength than a similar film formed from uncrosslinked polymer.

In another aspect of this invention, an acrylic copolymer such as described above is first admixed with a lactone prior to polyol crosslinking. In this aspect, an acrylic acid-acrylate copolymer is admixed with a lactone and heated. To the reaction mass is then added an appropriate amount of the desired polyol and this mixture reacted at elevated temperatures preferably in the presence of an esterification catalyst.

Lactones adapted to use in this invention are illustrated by β propiolactone, γ butyrolactone, δ valerolactone and ε caprolactone. The mole proportion of lactone to acrylic polymer should be about 1 to 1.5. The lactone-polymer mixture is suitably heated to about 100 to 200° C., preferably to reflux for about 2 to 4 hours under atmospheric pressure.

To the reaction mass is added an appropriate polyol, such as set forth above, in proportion similar to that set forth above. The reaction mass is heated to about 150 to 200° C. for a time sufficient to esterify the pendant carboxyl groups of the acrylic polymer to a desired extent. One suitable measure of the progress of the reaction is the efflux of water of esterification. Desirably, an acid esterification catalyst similar to that set forth above is included in the reaction mass with the polyol.

Example II

A copolymer of 80% butyl acrylate and 20% acrylic acid, 400 parts by weight, was mixed with 48.8 parts by weight of β propiolactone and refluxed for about 3 hours. To 160 parts by weight of this mass was added 15.2 parts by weight of trimethylol propane and 0.0152 part by weight of para toluene sulfonic acid; and this mixture was refluxed for about 1.5 hours to produce a crosslinked polymer having a solids content of 67.4 weight percent and a viscosity at 30° C. of 2440 cps. This polymer was formed into a film which had good cohesive strength and which, after heating to 300° F. for one hour, was tacky.

It is to be understood that the foregoing detailed description is given merely by way of illustration and that many variations may be made therein without departing from the spirit of our invention.

Having described our invention what we desire to secure by Letters Patent is:

1. The reaction product which is adapted to use as pressure sensitive adhesives of a copolymer of acrylic acid and acrylic acid ester, and a polyol selected from the group consisting of neopentylglycol, pentaerythritol, trimethylolpropane and trimethylolethane; said acrylic acid and said acrylic acid ester being first polymerized in a Cellosolve acetate-cumene solvent mixture at the reflux temperature of said solvent mixture in the presence of a peroxidic catalyst, and the resulting copolymer which contains free carboxyl groups then being cross linked by esterification with said polyol at a temperature of about 150° C. to 220°

C. in the presence of a strong acid esterification catalyst in a proportion of about 50 to 500 parts per million based upon total weight of reactants.

2. The reaction product of claim 1, wherein said acrylic acid ester is butyl acrylate and said polyol is trimethylolpropane.

3. The process for preparing cross linked copolymers which are adapted to use as pressure sensitive adhesives which comprises first copolymerizing butyl acrylate and acrylic acid in a Cellosolve acetate-cumene solvent mixture at the reflux temperature of said solvent mixture in the presence of a peroxidic catalyst to produce the copolymer having a hydrocarbon backbone containing at least carboxylic acid substituents thereon and then esterifying resulting copolymer with a polyol selected from the group consisting of neopentyl glycol, pentaerythritol, trimethylolpropane and trimethylolethane at a temperature of about 150 to 220° C. in the presence of a strong acid esterification catalyst in a proportion of about 50 to 500 parts per million based upon total weight of reactants.

4. The reaction product which is adapted to use as pressure sensitive adhesives of a copolymer of acrylic acid and acrylic acid ester, a lactone selected from the group consisting of beta-propiolactone, gamma-butyrolactone, gamma-valerolactone and epsilon-caprolactone, and a polyol selected from the group consisting of neopentylglycol, pentaerythritol, trimethylolpropane and trimethylolethane; said acrylic acid and said acrylic acid ester being first polymerized in a Cellosolve acetate-cumene solvent mixture at the reflux temperature of said solvent mixture in the presence of a peroxidic catalyst, the resulting copolymer which contains free carboxyl groups then being reacted with said lactone at a temperature of about 100° C. to 200° C., and this product being cross linked by esterification with said polyol at a temperature of about 150° C. to 220° C. in the presence of a strong acid esterification catalyst in a proportion of about 50 to 500 parts per million based upon total weight of reactants.

5. The reaction product of claim 3, wherein said acrylic acid ester is butylacrylate, said lactone is beta-propiolactone and said polyol is trimethylolpropane.

6. The process for preparing cross linked copolymers which are adapted to use as pressure sensitive adhesives which comprises first copolymerizing butyl acrylate and acrylic acid in a Cellosolve acetate-cumene solvent mixture at the reflux temperature of said solvent mixture in the presence of a peroxidic catalyst to produce an olefinic copolymer having carboxylic acid substituents thereon; reacting resulting copolymer with a reactant selected from the group consisting of beta-propiolactone, gamma-butyro lactone, gamma-valero and epsilon-caprolactone by heating said lactone and said copolymer to a temperature of about 100 to 200° C.; and then reacting the reaction product of said lactone and said copolymer with a polyol selected from the group consisting of neopentyl glycol, pentaerythritol, trimethylolpropane and trimethylolethane at a temperature of about 150 to 220° C. in the presence of a strong acid esterification catalyst.

References Cited by the Examiner
UNITED STATES PATENTS 2,962,524  11/1960  Hostettler et al. _____ 260—76
3,027,357   3/1962  Stickle _____ 260—86.1

JOSEPH L. SCHOFER, *Primary Examiner.*

JOSEPH R. LIBERMAN, JAMES A. SEIDLECK,
*Examiners.*

H. WONG, *Assistant Examiner.*